(No Model.)

W. McCLELLAND.
WAGON TRACK.

No. 592,433. Patented Oct. 26, 1897.

Witnesses.
Isaac V Smith
Geo W Prather

Inventor.
William McClelland

UNITED STATES PATENT OFFICE.

WILLIAM McCLELLAND, OF BLOOMINGTON, NEBRASKA.

WAGON-TRACK.

SPECIFICATION forming part of Letters Patent No. 592,433, dated October 26, 1897.

Application filed April 30, 1897. Serial No. 634,663. (No model.)

*To all whom it may concern:*

Be it known that I, WILLIAM MCCLELLAND, a citizen of the United States of America, residing at Bloomington, in the county of Franklin and State of Nebraska, have invented certain new and useful Improvements in Wagon-Tracks; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in wagon tracks or tramways, the object of the invention being to provide a track for vehicles, which is used in connection with bridges, scales, areaways, or in other places where it is desirable that wagons or vehicles should travel in a given space; and my invention consists in a metal track having an upwardly-projecting flange which is used in combination with end pieces which are flared outwardly from the track and flanged to provide guides for the wheels, the flanges being braced by supplemental rails, as will be hereinafter fully set forth, and specifically pointed out in the claim.

Figure 1:
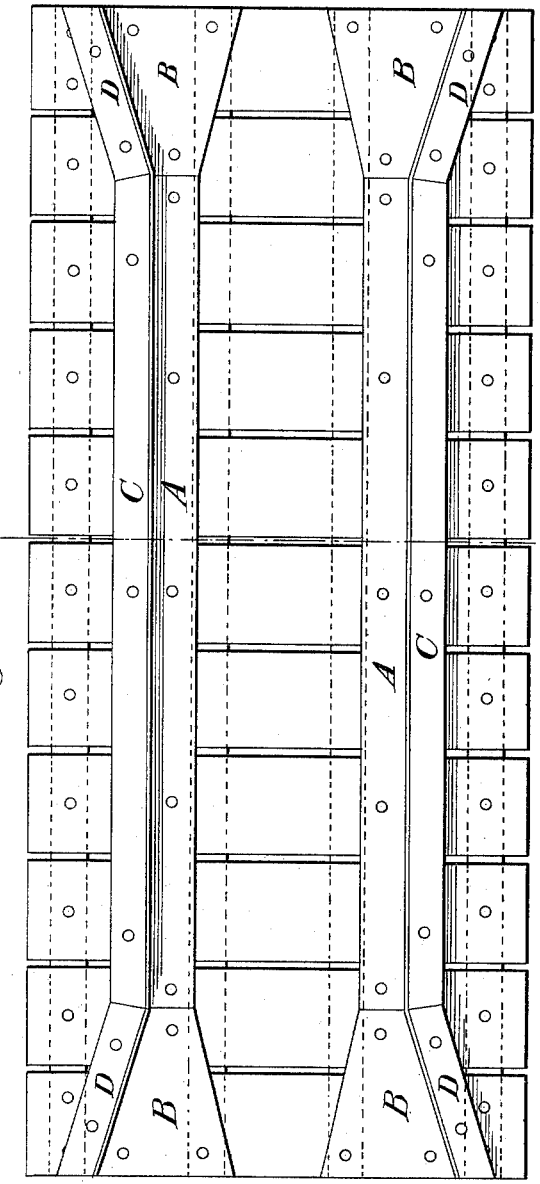
Figure 2:
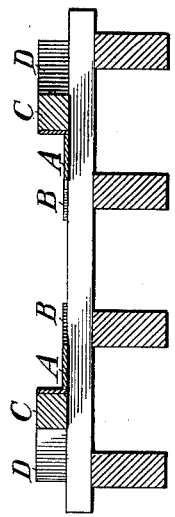

In the accompanying drawings, which illustrate my invention, Figure 1 is a plan view of a wagon track or way constructed in accordance with my improvement. Fig. 2 is a transverse sectional view.

For the purpose of illustrating my invention I have shown the same applied to a structure which may represent a bridge, the floor of the same being supported on longitudinal girders or beams. To the floor-boards are secured angle-bars having horizontal portions, upon which the wagon travels, and vertical portions A at right angles therewith, and these angle-bars are secured to the floor-boards by bolts passed through apertures which are countersunk so that the heads thereof will be flush with the rail upon which the wagon-wheel travels. Two bars are arranged upon the floor-boards, so as to be parallel with each other, and are braced by beams C, which are secured to the floor-boards so as to abut against the vertical flanges of the rails A. At the ends the way or track is provided with guide-pieces B, which have vertical flanges which diverge from the flanges of the way A, and the base portion of the guide or end plates B diverge in an opposite direction from the vertical flanges thereof. Braces D are also provided for the vertical flanges of the guide-pieces B.

By the construction shown when a wagon is driven upon the bridge the wheels thereof will be guided by the end plates to the parallel track or way, and the wheels traveling thereon will save the floor-boards.

Though I have described this invention as applied particularly to bridges, it is obvious that it may be used in many other places.

I am aware that prior to my invention it has been proposed to provide a wagon track or way with a flanged rail and means for guiding a vehicle thereto, and I therefore do not claim such invention broadly; but

What I claim as new, and desire to secure by Letters Patent, is—

In a wagon-track for bridges or similar structures having a flooring, the combination with a pair of parallel angle-bars A, A, the horizontal flanges thereof being secured to the flooring, parallel beams C, C, also secured to the flooring so that the vertical members of the angle-bars will abut against the same, of guide-pieces B, B, positioned at each end of the angle-bars, said guide-pieces having vertical flanges which diverge outwardly and horizontal portions which taper or increase in width from the ends of the parallel tracks outwardly, and brace-beams D, for the vertical flanges of the end plates, substantially as and for the purpose set forth.

WILLIAM McCLELLAND.

Attest:
F. F. BROWN,
J. T. PETTYS.